(No Model.)

G. BOXLEY.
LUBRICATING CUP.

No. 269,175. Patented Dec. 19, 1882.

Witnesses,
Jas. C. Hemphill,
T. W. Larwood

Inventor,
Geo. Boxley.
— by —
William H. Low,
Attorney.

UNITED STATES PATENT OFFICE.

GEORGE BOXLEY, OF TROY, NEW YORK, ASSIGNOR OF ONE-HALF TO THEODORE E. HASLEHURST, OF SAME PLACE.

LUBRICATING-CUP.

SPECIFICATION forming part of Letters Patent No. 269,175, dated December 19, 1882.

Application filed September 9, 1882. (No model.)

*To all whom it may concern:*

Be it known that I, GEORGE BOXLEY, of Troy, in the county of Rensselaer and State of New York, have invented certain new and useful Improvements in Lubricating-Cups, of which the following is a full and exact description.

My invention relates to improvements in cups for containing a lubricant of oleine, heavy oil, or other material requiring a slight degree of heat to produce the requisite liquidity in the lubricant to cause it to flow with sufficient freedom to supply the moving machinery with its needed lubrication; and the object of my improvements is to provide proper facilities for diffusing the heat required for producing a liquid condition of the lubricant through the mass of material contained in the cup in such a thorough and equable manner that the entire mass will be affected thereby; and by so doing I remedy a well-known defect in the cups now used for such lubricants, wherein only a small portion of the lubricating material is brought under the influence of the heat generated by the moving parts of the machinery to which the cup is applied. I attain the above-named object by means of the appliances illustrated in the accompanying drawings, which form part of this specification, and in which—

Figure 1:
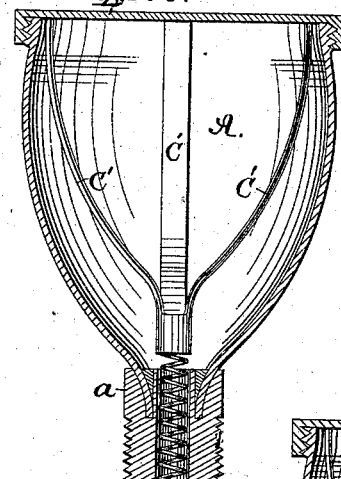

Figure 1 is a vertical section of a lubricating-cup containing my improvements, and Figs. 2, 3, 4, and 5 are like views of several modified forms of my improvement.

Figure 2:
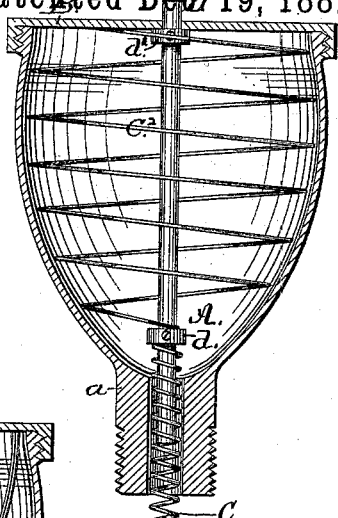

As represented in the drawings, A denotes the cup for containing the lubricant, and, as shown in Figs. 1, 3, 4, and 5, said cup is made of glass, and is cemented or otherwise secured into a hollow metallic screw-stem, $a$, the latter being provided for the purpose of attaching the cup to the machinery it is applied to; but, as represented in Fig. 2, the cup A is made of metal, and the screw-stem $a$ is made integral therewith.

B is the cover for the cup A, and is made attachable thereto by means of a screw-thread, or in any other suitable manner. Each cup is provided with a heat-conductor for the purpose of melting the lubricant contained in the cup; and, as shown in Fig. 1, said heat-conductor consists of a spiral spring, C, having light metallic divergent arms or springs C', which are secured to the spring C and bear against the cover B. The spring C protrudes from the bore of the stem $a$ and extends below said stem far enough to exert sufficient pressure against the shaft or other moving part of the machinery to produce in said spring a gentle degree of heat, which is conducted by the divergent arms C' into the mass of lubricant contained in the cup A, thereby rendering the lubricant sufficiently liquid to flow downward, and, by following the turns of the spring C, be delivered upon the moving parts of the machinery at the required points.

As shown in Fig. 2, the heat-conductor consists of a spiral spring, C, an expanding spiral spring, $C^2$, and a central metallic stem, D. The spiral spring C, constructed and arranged in relation to the screw-stem $a$ as shown and described in respect to Fig. 1, bears against the under side of a collar, $d$, secured to the stem D, and the spring $C^2$ is interposed between the upper side of the collar $d$ and the cover B. An adjustable collar, $d'$, near the upper end of the stem D, bears against the under side of the cover B, and affords the means of increasing and diminishing the pressure to be exerted by the spring C.

Figure 3:
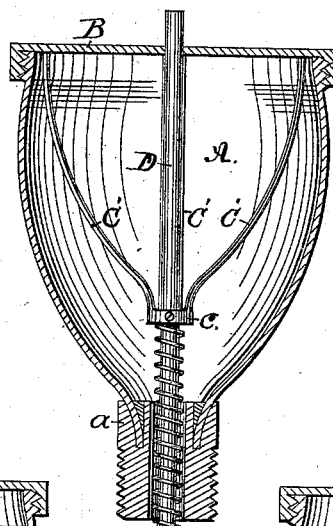

In Fig. 3 the heat-conductor consists of a spiral spring, C, divergent arms or springs C', and central stem, D. The divergent arms C' are attached to a collar, $c$, which is fixable to the stem D, and the upper ends of said arms bear against the cover B. The spiral spring C protrudes from the bore of the screw-stem $a$ in the manner and for the purpose hereinabove described.

Figure 4:
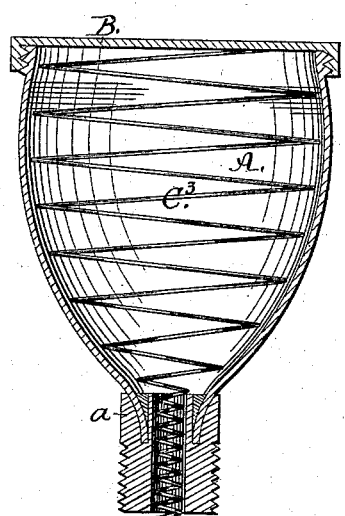

As shown in Fig. 4, the heat-conductor consists of a spiral spring composed of a lower portion, C, having a uniform diameter, and an upper portion, $C^3$, made in the form of an expanding spiral, as shown in the drawings. The lower end of the portion C protrudes from the bore of the stem $a$, as hereinbefore described, and the upper end of the portion $C^3$ bears against the under side of the cover B.

Figure 5:
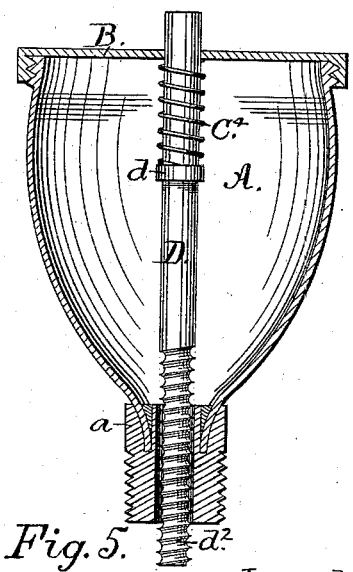

In Fig. 5 the heat-conductor consists of a central metallic stem, D, provided at its lower portion with a coarse screw-thread, $d^2$, and the rounded bottom of said thread forms a spiral channel for conveying the melted lubricant to the part to be lubricated. Near the upper end of the stem D a spiral spring, $C^4$, is interposed between a collar, $d$, (secured to said stem,) and the cover B, and by means of said spring the stem D is pressed against the part requiring lubrication with sufficient force to produce the requisite heat for melting the lubricant and rendering it liquid enough to flow down upon the part to be lubricated.

I claim as my invention—

1. A lubricating-cup, A, for containing oleine, heavy oils, or other grease-like lubricant that requires a gentle heat to render it liquid, in combination with a heat-conductor (contained in said cup) composed of spiral spring C, adapted to bear against the moving part of the machinery, and a divergent or expanding spring or springs extending upward into the mass of lubricant contained in the cup A, as and for the purpose herein specified.

2. The combination, with a lubricating-cup, A, of a heat-conductor contained in said cup for the purpose of melting the lubricant, said heat-conductor consisting of one or more springs, either with or without a central stem, D, one of said springs being adapted to bear directly upon the moving part of the machinery, as herein shown and described.

GEORGE BOXLEY.

Witnesses:
WILLIAM H. LOW,
EDWARD C. MEHLECK.